United States Patent [19]
Fulmer

[11] 3,768,608
[45] Oct. 30, 1973

[54] HYDRAULIC SPRING BRAKE CONTROL SYSTEM

[75] Inventor: Keith H. Fulmer, South Bend, Ind.

[73] Assignee: The Bendix Corporation, South Bend, Ind.

[22] Filed: Jan. 20, 1971

[21] Appl. No.: 107,966

[52] U.S. Cl..... 188/170 R, 60/54.5 H, 60/54.5 HA, 303/6 C, 188/106 P
[51] Int. Cl........................................... F16d 65/24
[58] Field of Search............ 188/170, 106 P, 106 F; 303/6 C; 60/54.5, 54.6 P, 54.5 H, 54.5 HA

[56] References Cited
UNITED STATES PATENTS

| | | | |
|---|---|---|---|
| 3,625,005 | 12/1971 | Saunders et al. | 60/54.6 P |
| 3,633,363 | 1/1972 | Larsen | 60/54.6 P |
| 3,547,233 | 12/1970 | Girvan | 188/106 P |
| 3,176,467 | 4/1965 | Van House | 188/170 X |
| 3,599,761 | 8/1971 | Schultz et al. | 188/170 |
| 3,586,388 | 6/1971 | Stelzer | 303/6 C |
| 3,159,247 | 12/1964 | Charlton | 188/170 |
| 3,567,290 | 3/1971 | Ligget et al. | 303/6 C |
| 2,418,666 | 4/1947 | Rockwell | 188/170 X |
| 3,576,350 | 4/1971 | Larsen | 303/6 C |

FOREIGN PATENTS OR APPLICATIONS

| | | | |
|---|---|---|---|
| 892,497 | 3/1962 | Great Britain | 303/6 C |

Primary Examiner—Evon C. Blunk
Assistant Examiner—Merle F. Maffei
Attorney—Ken C. Decker and Plante, Hartz, Smith and Thompson

[57] ABSTRACT

A vehicle hydraulic braking system is disclosed which includes a hydraulic brake booster which operates a standard automotive master cylinder. Disc brakes which include a hydraulic service actuator and spring-applied parking actuator are mounted on at least two of the wheels of the vehicle. Pressurized fluid from a hydraulic source, such as the vehicle's power steering pump, is used to operate the brake booster when a service brake application is effected. The spring actuator on each of the disc brakes includes a pressure responsive device that opposes the resiliency of the springs. Fluid is communicated from the booster pressure chamber to the pressure responsive device when the engine of the vehicle is started and the first brake application is effected to release the spring actuator. A control valve is provided so that fluid may be purged from the pressure responsive means when the vehicle is parked or when an emergency occurs. The fluid pressure from the booster pressure chamber is communicated to a pressure intensifier which increases the fluid pressure level that is provided to the pressure responsive means. The pressure intensifier includes a manually operated device to release the spring brake when a malfunction in the vehicle's hydraulic system prevents fluid communication to the booster pressure chamber.

9 Claims, 2 Drawing Figures

INVENTOR
KEITH H. FULMER
BY Ken C. Decker
ATTORNEY

HYDRAULIC SPRING BRAKE CONTROL SYSTEM

BACKGROUND OF THE INVENTION

Large automotive vehicles are expected to use heavy duty, hydraulically actuated disc brakes instead of the currently used air brakes in the near future. The heavy duty disc brakes are expected to include a spring actuator in addition to the usual service actuator for use as a parking or emergency brake. Such a brake is disclosed in U. S. Pat. application Ser. Nos. 797,530, filed Feb. 7, 1969; and 38,459, filed May 18, 1970, both of which are owned by the assignee of the present invention and incorporated herein by reference. In any vehicle equipped with the disc brakes disclosed in the aforementioned applications, a suitable hydraulic system must be provided to actuate the brakes. The present invention discloses a system for actuating spring disc brakes which uses a hydraulic brake booster in combination with a standard automotive master cylinder and a pressure intensifying device.

SUMMARY OF THE INVENTION

Therefore, an important object of my invention is to provide a vehicle hydraulic system for actuating a heavy duty disc brake having both a spring actuator and a service actuator.

Another important object of my invention is to provide a vehicle hydraulic system for actuating heavy duty disc brakes which are provided with a spring actuator that may be released by merely applying the brake pedal after the vehicle's engine is started.

Another important object of my invention is to provide a vehicle hydraulic system for actuating a spring-applied disc brake which has fewer components than the similar hydraulic systems known in the prior art.

Still another important object of my invention is to provide a vehicle hydraulic system for operating spring-applied disc brakes in which the spring actuator may be mechanically released if a malfunction in the vehicle's hydraulic system prevents proper operation of the vehicle's brake booster.

DETAILED DESCRIPTION

Figure 1:
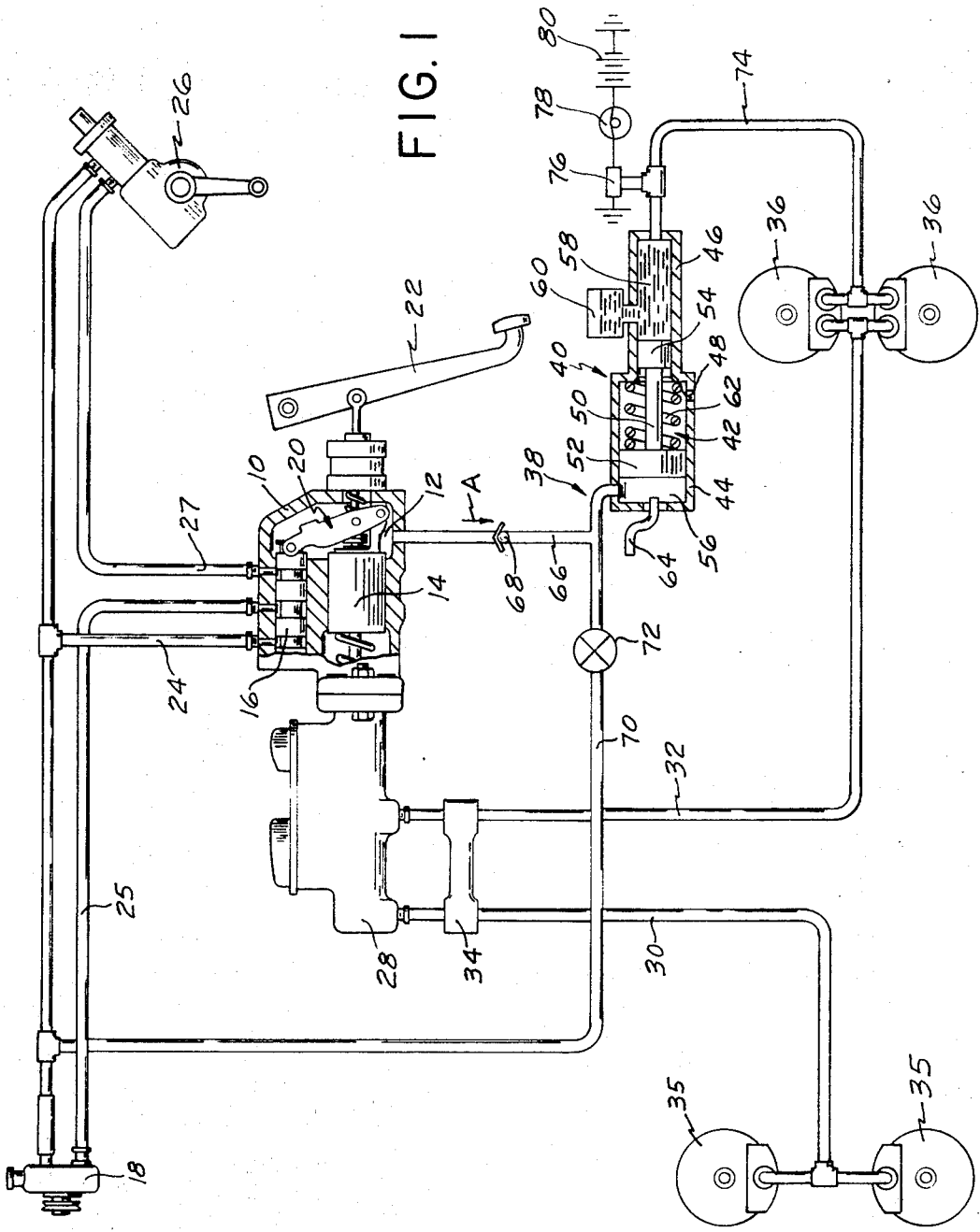
FIG. 1 is a schematic view of a vehicle hydraulic system made pursuant to the teachings of my present invention.

Referring now to the drawings, a brake booster housing 10 defines a pressure chamber 12 therewithin in which a piston 14 is slidably mounted. A spool valve 16 is reciprocable within the booster housing 10 and controls fluid communication between the pressure chamber 12 and the vehicle's power steering pump 18. The spool valve 16 is operated by appropriate mechanism generally indicated by the numeral 20 which is actuated by the usual brake pedal 22 mounted in the operator's compartment of the vehicle. When the vehicle operator effects a brake application by depressing the pedal 22, the spool valve 16 is shifted from a first position in which the pressure chamber 12 is vented to the inlet of the pump 18 through a conduit 24 to a second position in which high pressure fluid is communicated into the chamber 12 from the outlet of the pump 18 through the conduit 25. The hydraulic system illustrated in FIG. 1 is of the so-called "open-center" type in which fluid continuously flows through the booster housing 10 between the power steering pump 18 and the power steering gear 26, even when the spool valve 16 is disposed in the brake release position. The outlet of the steering gear 26 is also communicated to the inlet or low pressure side of the pump 18. When a brake application is effected, only a portion of the fluid flowing through the hydraulic system is communicated into the pressure chamber 12, and the remainder of the fluid flows out of the booster 10 through a conduit 27 to operate the steering gear 26. Details of the construction and operation of the brake booster 10 are more completely disclosed in U. S. Pat. application Ser. No. 793,923, filed Jan. 16, 1969, owned by the assignee of the present invention and incorporated herein by reference.

When a brake application is effected, high pressure fluid is admitted into the pressure chamber 12 to shift the piston 14 to the left viewing FIG. 1. Movement of the piston 14 is transmitted to a standard automotive master cylinder 28 mounted to the left of the booster 10. The master cylinder 28 is of the "split system" type in which braking pressure is developed in two separate hydraulic circuits 30 and 32. A pressure differential warning switch 34 actuates a warning device in the operator's compartment of the vehicle when a malfunction causes one of the circuits 30 or 32 to develop substantially lower braking pressures than does the other circuit. The circuit 30 is communicated to the front wheel brakes 35 of the vehicle, and the other circuit 32 is communicated to the service actuator of the rear wheel of spring-actuated disc brake 36. Of course, brake fluid is utilized in the hydraulic circuits 30 and 32 while automatic transmission fluid is used in the hydraulic circuit in which the pump 18 is communicated.

Fluid is communicated to the spring brake actuator of the brakes 36 by structure indicated generally by the numeral 38. Structure 38 includes a pressure intensifier unit generally indicated by the numeral 40. Intensifier 40 includes a housing 42 defining a bore therewithin having larger diameter section 44 and a smaller diameter section 46 presenting a shoulder 48 therebetween. A piston 50 is slidably mounted within the housing 42 and includes a larger diameter portion 52 which reciprocates within the larger diameter section 44 of the housing 42 and a smaller diameter section 54 which reciprocates in the smaller section 46 of the housing 42. Opposite ends of the piston 50 cooperate with corresponding ends of the housing 42 to define first and second pressure chambers 56 and 58 respectively. A reservoir 60 is provided which communicates brake fluid into the chamber 58. Of course, appropriate structure (not shown) is provided to terminate communication between the reservoir 60 and the chamber 58 when the fluid in the latter is pressurized by the piston 50. A spring 62 yieldably urges the piston 50 to the left viewing FIG. 1. A manually manipulated crank 64 is provided to urge the piston 50 to the right viewing FIG. 1, against the bias of the spring 62.

A conduit 66 communicates the chamber 56 in the intensifier 40 with the pressure chamber 12 within the booster housing 10. A check valve 68 permits flow of fluid through the conduit 66 in the direction of the arrow A only and prevents flow of fluid through conduit 66 in the reverse direction. Another conduit 70 communicates the chamber 56 with the low pressure side or inlet of the power steering pump 18. A control valve 72 is provided in the conduit 70 that is manually operable from the operator's compartment of the vehicle to control flow of fluid between the chamber 56 and the inlet of the pump 18. Still another conduit 74 communicates the chamber 58 with the spring brake actuator within the housing of the disc brake 36. A pressure responsive switch 76 is wired in series with a warning lamp 78 mounted in the operator's compartment of the vehicle and with the vehicle's storage battery 80. The switch 76 actuates the lamp 78 when the fluid pressure level in the conduit 74 drops below a predetermined level to inform the vehicle operator that the spring actuators within the disc brakes 36 have urged the brakes into an applied condition.

Figure 2:
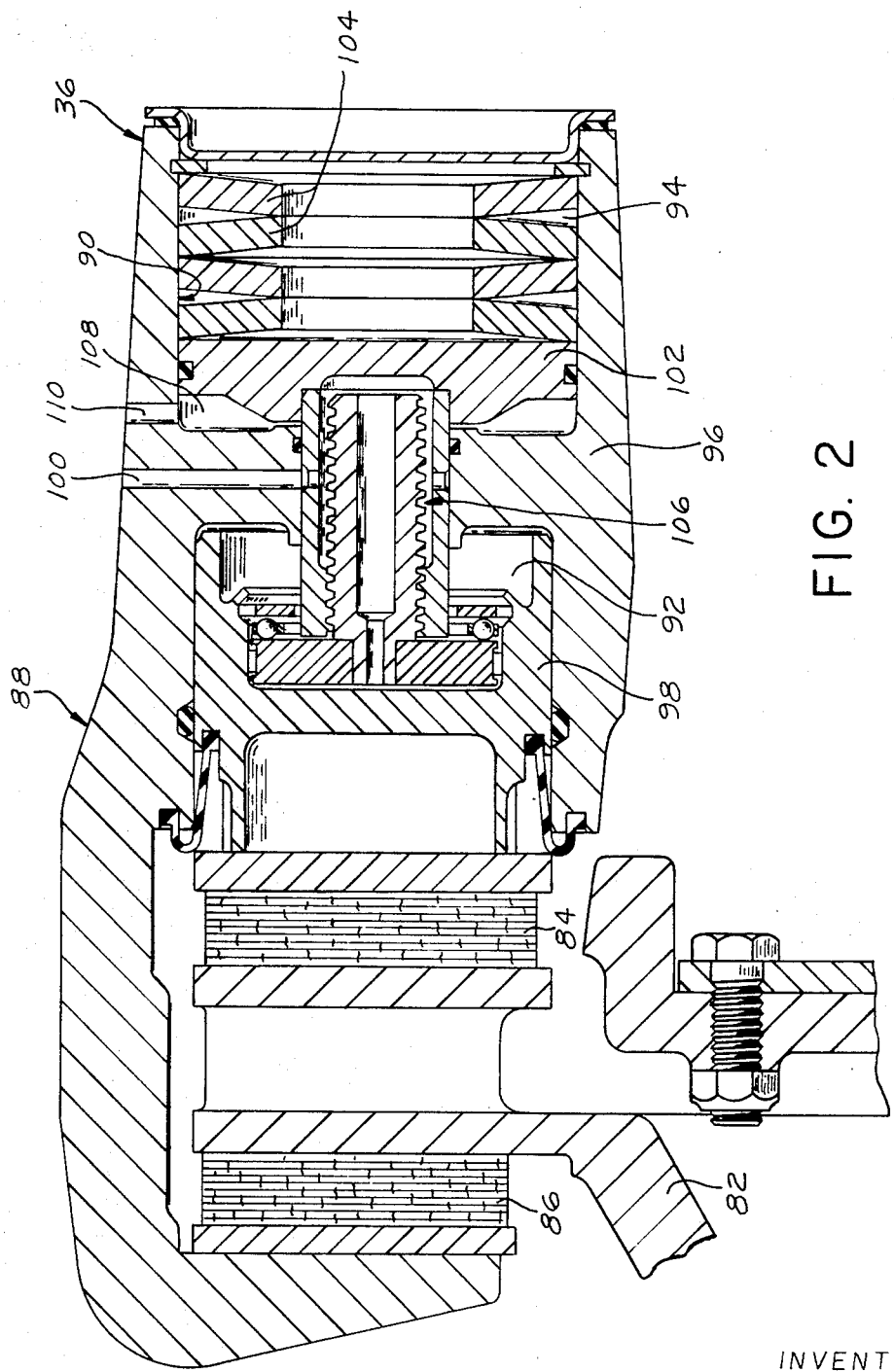
FIG. 2 is a cross-sectional view of a spring-actuated disc brake which is used with the hydraulic system illustrated in FIG. 1.

Referring now to FIG. 2, the disc brakes 36 each include a rotor 82 mounted for rotation with the member to be braked and a pair of friction elements 84 and 86 disposed on opposite sides of the rotor 82. A caliper generally indicated by the numeral 88 extends across the periphery of the rotor 82 and is adapted to urge the friction elements 84 and 86 into braking engagement with the rotor 82. The caliper 88 defines a bore 90 therewithin which is divided into first and second chambers 92 and 94 by an annular partition 96. The brakes 36 are provided with a service actuator which includes a piston 98 slidably mounted in the chamber 92 and an inlet port 100 which communicates the chamber 92 with the conduit 32 so that the piston 98 will be urged to the left viewing FIG. 2 when braking pressure is developed in the conduit 32 to effect a brake application in a manner well known to those skilled in the art.

The brakes 36 further include a spring actuator which includes a second piston 102 which is urged to the left viewing FIG. 2 by a plurality of Belleville spring washers 104. The piston 102 is operably connected with the piston 98 by an extendible member 106. The extendible member 106 lengthens as the friction element 84 and 86 wear to thereby limit retraction of the piston 98 to a substantially constant distance. The piston 102 cooperates with the annular partition 96 to define an annular fluid chamber 108 therebetween which is communicated to the conduit 74 by an inlet port 110. It will be noted that when fluid pressure at a sufficiently high level is admitted into the chamber 108, the piston 102 will be urged to the right viewing FIG. 2, thereby collapsing the Belleville spring washers 104 to permit movement of the piston 98 relative to the piston 102 and extendible member 106. However, when the chamber 108 is evacuated, the Belleville spring washers 104 release to urge the piston 102 to the left viewing FIG. 2. Since the pistons 102 and 98 are operatively connected by extendible member 106, movement of the piston 102 to the left first urges the extendible member 106 into engagement with the rear face of the piston 98, and thereafter urges the piston 102 and the piston 98 to the left as a unit to thereby urge the friction element 84 and 86 into engagement with the rotor 82. Details of the construction and operation of the brakes 36, and more particularly of the extendible member 106, are disclosed in the aforementioned U. S. Pat. application Ser. No. 38,459 filed May 18, 1970.

MODE OF OPERATION

Assuming that the vehicle has been parked and the spring actuator within the disc brake has urged the latter into an applied condition, the vehicle operator starts the vehicle's engine to initiate operation of the vehicle's power steering pump 18. High pressure fluid from the power steering pump 18 is communicated through the booster 10 to the power steering gear 26. However, the vehicle cannot be moved, since the spring actuator has urged the disc brakes 36 into an applied position. To release the spring actuator, the vehicle operator closes the control valve 72 and then depresses the brake pedal 22, thereby shifting the spool valve 16 to close communication between the pressure chamber 12 and the exhaust port 24 and to force a portion of the fluid flowing into the booster from the power steering pump 18 into the pressure chamber 12. Fluid in the pressure chamber 12 is communicated to the chamber 56 in the intensifier 40 through the conduit 66. High pressure fluid in the chamber 56 urges the piston 50 to the right viewing FIG. 1, against the bias of the spring 62, thereby increasing the pressure level of the fluid in the chamber 58. Fluid in the chamber 58 is communicated to the chamber 108 within the disc brake 36 by the conduit 74. As described above, high pressure fluid in the chamber 108 urges the piston 102 to the right viewing FIG. 2, thereby releasing the spring actuator. Of course, when the brake pedal 22 is depressed to admit high pressure fluid into the pressure chamber 12, the high pressure fluid also acts against the end of the piston 14 to urge the latter to the left viewing FIG. 1, to thereby develop braking pressure in the master cylinder 28. Braking pressure developed by the master cylinder 28 is communicated to the inlet port 100 by the conduit 32 and therefore into the chamber 92 where it acts upon the end of the piston 98 to effect a service brake application after the spring actuator has been released. When the vehicle operator releases the brake pedal 22, the pressure chamber 12 is vented to the reservoir at the inlet of the pump 18. A return spring urges the piston 14 to the right viewing FIG. 1, thereby releasing braking pressure in the master cylinder 28, therefore releasing the pressure in the chamber 92. However, pressure at a high level is maintained in the chamber 56 and the intensifier 40, since the check valve 68 prevents return of the fluid in the chamber 56 to the pressure chamber 12 after the control valve 72 has been closed. The vehicle may then be moved. Service brake actuation is accomplished in the normal manner while the vehicle is in motion by depressing the pedal 22 to admit fluid pressure into the pressure chamber 12 which shifts the piston 14 to develop braking pressure in the master cylinder 28 which is communicated into the chamber 92 to effect a brake application.

When the vehicle is parked, the spring actuator may be used as a parking brake. When the vehicle operator applies the spring actuator, the control valve 72 is opened to permit fluid communication between the chamber 56 and the inlet of the pump 18. The pressure in the chamber 56 is thereby vented to a relatively low pressure level, permitting the spring 62 to urge the piston 50 to the left, viewing FIG. 1, thereby reducing the fluid pressure level in the chamber 58 and therefore, also reducing the fluid pressure level in the chamber 108. The Belleville spring washers 104 then urge the piston 102 to the left viewing FIG. 2, thereby effecting a spring brake actuation as described above. When the pressure level in the chamber 58 is reduced, the pressure switch 76 actuates the warning light 78 to inform the vehicle operator that a spring brake application has been effected. When the vehicle is to be moved, the vehicle operator releases the spring brake by closing the control valve 72, starting the vehicle's engine, and then depressing the brake pedal 22.

It is also desirable to be able to manually release the spring actuator within the disc brake 36, so that the vehicle may be towed if the engine cannot be started and the spring brake released in the normal manner. For this reason, a crank 64 is provided that extends through the housing of the intensifier 40. Rotation of the end of the crank that extends through the housing moves the other end of the crank into engagement with the piston 50. Further rotation of the crank moves the piston 50 to the right viewing FIG. 1, against the bias of the spring 62. Pressure is therefore developed in the chamber 58, which is communicated into the chamber 108 by the conduit 74 to release the spring actuator.

I claim:

1. In a vehicle hydraulic system:
a fluid pressure source;
a hydraulic brake actuating assembly including a master cylinder portion and a brake booster portion;
said booster portion including a housing defining a pressure chamber therewithin, a piston slidably mounted in said pressure chamber and operably connected to said master cylinder portion, and operator-operated valve means for controlling fluid communication between the pressure chamber and the pressure source for sliding said piston to develop braking pressure in said master cylinder portion;
a brake including a service actuator communicated to said master cylinder portion and a brake booster portion;
said booster portion including a housing defining a pressure chamber therewithin, a piston slidably mounted in said pressure chamber and operably connected to said master cylinder portion, and operator-operated valve means for controlling fluid communication between the pressure chamber and the pressure source for sliding said piston to develop braking pressure in said master cylinder portion;
a brake including a service actuator communicated to said master cylinder portion for effecting a brake application when braking pressure is developed in the master cylinder, and a spring actuator including resilient means yieldably urging said brake into an applied condition and pressure responsive means opposing said resilient means when pressurized fluid is communicated to said pressure responsive means;
structure communicating said pressure responsive means to said pressure chamber to thereby prevent said resilient means from urging said brake into an applied condition when pressurized fluid is admitted into said pressure chamber;
said structure including a pressure intensifying device to increase the fluid pressure level delivered to said pressure responsive means to a valve higher than the fluid pressure level in said pressure level and a first conduit communicating said intensifying device to the pressure chamber, check valve means in said conduit to maintain the pressure level in said intensifying device and therefore the pressure communicated to said other means at a level sufficient to oppose the resilience of said resilient means after pressurized fluid is admitted into said pressure chamber; and
an operator-actuated control valve for venting said intensifying device to a fluid reservoir to permit said resilient means to apply said brake.

2. In a vehicle hydraulic system:
a fluid pressure source;
a hydraulic brake actuating assembly including a master cylinder portion and a brake booster portion;
said booster portion including a housing defining a pressure chamber therewithin, a piston slidably mounted in said pressure chamber and operably connected to said master cylinder portion, and operator-operated valve means for controlling fluid communication between the pressure chamber and the pressure source for sliding said piston to develop braking pressure in said master cylinder portion;
a brake including a service actuator communicated to said master cylinder portion for effecting a brake application when braking pressure is developed in the master cylinder, and a spring actuator including resilient means yieldably urging said brake into an applied condition and pressure responsive means opposing said resilient means when pressurized fluid is communicated to said pressure responsive means;
structure communicating said pressure responsive means to said pressure chamber to thereby prevent said resilient means from urging said brake into an applied condition when pressurized fluid is admitted into said pressure chamber;
said structure including a pressure intensifying device having a housing defining a stepped bore therewithin having larger and smaller diameter sections with a shoulder therebetween, a stepped piston having a larger diameter portion slidable in the larger portion of the bore, and a smaller diameter portion slidable in the smaller portion of the bore, the larger and smaller ends of the piston cooperating with the corresponding ends of the bore to define first and second fluid chambers respectively therebetween;
said first chamber being communicated to said pressure chamber;
said second chamber being communicated to said pressure responsive means.

3. In a vehicle hydraulic system:
a fluid pressure source;
a hydraulic brake actuating assembly including a master cylinder portion and a brake booster portion;
said booster portion including a housing defining a pressure chamber therewithin, a piston slidably mounted in said pressure chamber and operably connected to said master cylinder portion, and operator-operated valve means for controlling fluid communication between the pressure chamber and the pressure source for sliding said piston to develop braking pressure in said master cylinder portion;
a brake including a service actuator communicated to said master cylinder portion for effecting a brake application when braking pressure is developed in the master cylinder, and a spring actuator including resilient means yieldably urging said brake into an applied condition and pressure responsive means opposing said resilient means when pressurized fluid is communicated to said pressure responsive means;

structure communicating said pressure responsive means to said pressure chamber to thereby prevent said resilient means from urging said brake into an applied condition when pressurized fluid is admitted into said pressure chamber;

said structure including a check valve dividing said structure into a first section between the check valve and the pressure chamber and a second section between the check valve and said pressure responsive means, said check valve being effective to prevent return flow of fluid through said structure into said pressure chamber; and conduit means communicating said second section to a fluid reservoir;

said conduit means including operator-actuated control means for initiating and terminating fluid communication through said conduit means.

4. The invention of claim 2:

spring means yieldably urging the larger end of the piston toward the corresponding end of said bore to thereby reduce the fluid pressure level in said second chamber when the first chamber is vented to said fluid reservoir; and manually manipulable means carried by the housing for urging said piston away from the larger end of the housing to communicate fluid to said pressure responsive means at a pressure level sufficient to oppose said resilient means when a malfunction prevents fluid communication into said first chamber from said pressure chamber.

5. The invention of claim 2:

the fluid communicated into said first chamber being hydraulic fluid, the fluid in said second chamber communicated to said pressure responsive means being brake fluid; and a reservoir communicated to said other chamber for storing said brake fluid.

6. The invention of claim 1:

a warning device mounted in the vehicle operator's compartment; and pressure responsive switch means responsive to the fluid pressure level at said pressure responsive means to actuate said warning device when the fluid pressure level at said pressure responsive means falls below a predetermined value, to thereby inform the vehicle operator that said spring actuator has effected a brake application.

7. The invention of claim 3; and a pressure intensifying device in said second section for supplying fluid to said pressure responsive means at a higher pressure level than that available to said pressure chamber.

8. The invention of claim 3; and manually manipulable means on said second section releasing said spring actuator when a malfunction prevents fluid communication between the pressure chamber and said other areas.

9. The invention of claim 3:

a warning device mounted in the vehicle operator's compartment; and pressure responsive switch means sensitive to the fluid pressure level in said second section to actuate said warning device when the pressure level in said second section falls below a predetermined level to inform the vehicle operator that said spring actuator has effected a brake application.

* * * * *